United States Patent Office 3,761,449
Patented Sept. 25, 1973

3,761,449
HIGH MOLECULAR WEIGHT
POLYALKYLARYL ETHERS
Martin H. Kaufman, 308 Blue Ridge Road,
China Lake, Calif. 93555
No Drawing. Filed Nov. 23, 1971, Ser. No. 201,495
Int. Cl. C08g 23/00
U.S. Cl. 260—61        8 Claims

ABSTRACT OF THE DISCLOSURE

This invention is for improved moldable high molecular weight polymer compositions consisting of polyalkylarylethers and the process for preparation thereof which briefly involves reacting reactive-chlorine difunctional chloromethyl derivatives with diphenolic compounds in an inert solvent for the polymer product. This composition provides high molecular weight polymers, the low melting polymers being useful as emulsifiers, plasticizers, and for cosmetic preparations, the high melting polymers being useful in molded reinforced plastics, synthetic fibers, and synthetic films.

---

The present invention concerns new, improved, and useful high molecular weight high polymer materials prepared by a process involving the reaction of reactive chlorine difunctional chloromethyl-derivatives, hereinafter called RCDCMD, with diphenolic compounds, hereinafter called DPC, in an inert solvent for the polymer product in the presence of a base. Both reactants and solvent are free from other substituents reactive under the conditions of the reaction.

It is taught in United States Letters Patent 3,219,628 that new resinous copolymers, useful in the preparation of thermoset polymers by reaction with formaldehyde-furnishing compounds, may be prepared by reacting poly (chloromethylated) aromatic compounds with hydroxylated aromatic compounds in the presence of a base. More specifically, the reference teaches the preparation of resinous copolymers in the presence of sodium hydroxide and the use of dioxane and water as reaction mediums. Resinous materials thus prepared, without other modification, are of relatively low molecular weight. Such low molecular weight polymers exhibit low strength characteristics.

Foamed, mostly insoluble resinous materials, are formed by the reaction in the presence of bases such as calcium oxide, calcium hydroxide, and potassium carbonate when no liquid medium is present at the temperature of the reaction. Side reactions take place at the elevated reaction temperatures when a liquid base such as pyridine is used both as the base and as the liquid medium.

It is a principal object of the present invention to provide novel and improved moldable high molecular weight compositions consisting of polyalkylarylethers. A further object is to provide highly oriented synthetic fibers and films from the high molecular weight products of the invention. A still further object is to provide high strength high temperature stable moldable objects from the high molecular weight products of the invention which may be mixed with high strength fibers such as glass, carbon, boron, and other coated and uncoated reinforcing agents known to the art. Still another object of the invention is to provide low melting, high molecular weight polymers which may be used as emulsifiers, plasticizers, and in cosmetic preparations. Still another object of the invention is to provide a method for preparing such high molecular weight compositions.

In accordance with the present invention, it has been discovered that polymeric compositions prepared from RCDCMD and DPC have substantially improved structure and strength properties by virtue of a large molecular weight increase caused by carrying the reaction out in a so-called polar solvent for the resultant polymer composition, the solvent being non-reactive with other reaction constituents under the conditions of reaction. It has also been discovered that by such process the polymeric compositions are prepared very quickly and in substantially all cases in quantitative yields.

In order to obtain high molecular weight polymers the ratio of reactive chlorine to reactive hydroxyl should be close to one. A slight excess of either reactive chlorine or reactive hydroxyl may be used without detriment and in fact is useful if a particular terminal moiety, either reactive chlorine or reactive hydroxyl, is desired. A particular terminal moiety is desirable when further reaction with the high polymer is contemplated. Such further reactions would include, for example, polymer extension with diacidanhydrides, diacidchlorides, diisocyanates, and the like, formaldehyde reactions, the attachment of chromatic groupings, block copolymer extensions, providing for increased thermally stable end groups.

The reactions for production of the high polymers are accomplished merely by heating the aforementioned starting mixtures to temperatures at which hydrogen halide is formed. The hydrogen halide is neutralized by base contained in the reaction system. The reaction rate may be increased by raising the temperature still more. It is often necesary to increase the temperature to maintain the solution of the polymer product as its molecular weight continues to increase. The reaction rate may also be increased by substituting a more reactive halogen, for example, bromine for the chlorine in RCDCMD.

It is known to the art, see for example, Organic Synthesis by Vartkes Migrdichian, Reinhold Publishing Company, New York (1957) pages 526–529, that the reactivity of the halogen attached to a methylene group, $CH_2Cl$, is enhanced if the following groups are joined to the methylene: carbon-carbon double bond, carbon-carbon triple bond, phenyl, naphthyl, carbonyl, carboxyl, nitrile, ether, nitro, thiocyanate. The insertion of an additional methylene group, a buffer carbon, between a chloromethylene and its enhancing group reduces the activity of the chloride.

Of the three halogens, iodine, bromine and chlorine, iodides are generally the most reactive among monohalides derived from the same hydrocarbon, while chlorides are generally the least reactive. Chlorine is the most economical of the halides and is therefore preferred, however, it is clear that a faster reaction rate will occur in the present invention if bromide derivatives are utilized rather than chloride derivatives. The insertion of an additional methylene group, a buffer carbon, between a chloromethylene and its enhancing group reduces the activity of the chloride. The reduction in enhancement of reactivity does not necessarily mean that the reactivity is reduced to a point where the reaction according to the present invention does not take place. Although the reactivity of a halogen attached to a methylene group is enhanced if certain groups are attached to the methylene, the presence of certain other groups may vitiate the halogen reactivity. The present invention is based upon reactive halogens, halogens whose reactivity is more or less enhanced, however, sufficiently enhanced for the polymerization to proceed to high molecular weight products according to the process of the present invention.

When two such enhanced reactivity halogens attached to different methylene groups reside in the same compound, we have the class of compounds RCDCMB, RCDCMB can be represented as a member selected from the group consisting of two chloromethyl radicals having the formula $$ClCH_2—X—(Y)—X—CH_2Cl$$

wherein X represents aforementioned enhancing group, example, phenyl,

or ether, —O—, and aforementioned enhancing groups attached to an inserted buffer carbon, for example, ether, —CH$_2$—O— or nitrile,

and Y represents a moiety, substituent or polymer which is none reactive under the conditions of reaction. Two chloromethyl radicals may be attached to the same enhancing group as, for example,

wherein both chlorines are activated by the single aromatic structure. An example of the effect of an inserted carbon buffer between the enhancing group and the reactive halogen on methylene follows.

$$Cl—CH_2—O—CH_2—Cl$$

in the present invention rapidly reacts with DPC while $$ClCH_2—CH_2—O—CH_2—CH_2—O—CH_2—CH_2—Cl$$

reacts but at a slower rate. Substituting bromide for chloride in the latter RCDCMB increases the reaction rate substantially and, therefore, bromine is the preferred halide when an additional methylene group or buffering carbon is inserted between the enhancing group and the halomethyl group. The spirit of the present invention involves the enhancement of the reactivity of the halogen which is attached to a methylene. It is not intended that the location of the enhancing group and its effect on the reaction rate be construed as limiting. It is only required that the reactivity of the halogen on methylene be enhanced and this is recognized by the formation of high molecular weight polymer by procedures described in the present invention. To put it another way, although the enhancement of reactivity of the halogen attached to a methylene group, —CH$_2$Cl, is reduced if the enhancing group is further removed from the chloromethyl group, the halogen attached to the methylene group may still be sufficiently enhanced to take part in the formation of high molecular weight polyalkylarylethers according to the present invention. This shall be illustrated by example. Moreover, it is clear that a more rapid reaction rate may be provided by using bromine halogen rather than chlorine halogen. The insertion of still another methylene group or other moiety almost completely vitiates the halogen reactivity enhancement and does not come within the spirit and scope of the present invention.

The effect on the product properties of utilizing a reaction medium in which the polymeric product is soluble is illustrated in Table 1. In each case stoichiometric quantities of bis(4-chloromethyl) diphenylether was reacted with bisphenol-A=2,2 - bis(4-hydroxyphenyl) propane=4,4'-isopropylidenediphenol.

TABLE 1

| Reference | Reaction medium | Reaction temp., °C. | Base | Properties M.P., °C. | [η]ᵃ | Physical |
|---|---|---|---|---|---|---|
| U.S. 3,219,618 | Dioxane | 83 | NaOH | 47 | 0.03 | Very weak. |
| U.S. 3,075,949 | 75/25, dioxane/ethanol | Reflux | NaOC$_2$H$_5$ | 121 | 0.21 | Do. |
| This invention | Dimethylacetamide ᵇ | 90–200 | K$_2$CO$_3$ | 192 | 2.5 | Very strong. |

ᵃ Intrinsic viscosity number from measurements at 40° C in hexamethylphosphoramide.
ᵇ The high molecular weight polymer is insoluble in dioxane, ethanol, and mixtures thereof.

In some cases of the present invention the polymer product may precipitate in the liquid medium after some high molecular weight has been reached. In these cases the highly swollen polymer continues to increase in molecular weight at a more or less slower rate, however, it is preferred that the reaction medium solubilizes the product polymer.

To achieve satisfactory yields, molecular weight, and color, it is necessary to remove or neutralize the hydrogen halide byproduct of the reaction. Often this is done by including in the reaction mixture a suitable base such as sodium hydroxide, sodium ethoxide and the like. But since the presence of such bases may cause undesirable hydrolysis of the reactants thereby altering the stoichiometry of the reactants and causing the polymer produced to have a lower molecular weight, it is advantageous to use an alkali carbonate such as anhydrous K$_2$CO$_3$ and the like. Furthermore, the use of pyridine or other nitrogen bases are to be avoided at elevated temperatures since undesirable side-reactions may take place which cause the polymer produced to have a lower molecular weight and, in addition, may cause the introduction of undesirable color. The molecular proportion of the alkali used must be at least twice the molecular proportion of the RCDCMD but the presence of alkali in excess of this requirement is not detrimental as it has no effect on the nature of the reaction.

It was unexpectedly found that not only must the reaction be carried out in an inert solvent for the polymer product in order to achieve high molecular weight in a short time but that the nature of the inert solvent has an effect on the polymer product. This will become clearer from the examples tabulated in Table 2. When a very polar inert solvent for the polymer is used as a reaction medium a fusible, moldable product is obtained. When an inert solvent of medium polarity is used the product is partially crosslinked. When a nonpolar inert solvent is used the product appears very crosslinked. If the polymer product is soluble in a non-polar inert solvent, crosslinking may be prevented by adding a miscible inert highly polar solvent to the reaction system.

Although those polymer products which appear to be crosslinked do not fully or readily flow under heat and pressure, they may still be molded into useful products which are strong, hard and stable at elevated temperatures by using high pressures and temperatures for molding. Such polymeric products which act as though they are somewhat crosslinked may be molded into useful products which are strong and hard, however, high pressures and temperatures are required and the resultant molded product often appears to have lumps of material which did not flow. Although the resultant polymers appeared crosslinked they were produced in 100% yield. This was unexpected. The above will become clearer from the data in Table 2, which are examples of the present invention. The examples given in Table 2 are given to illustrate the effect of solvent type on the products that may be prepared in accordance with the present invention as well as to display utility of said reaction products, but are not to be construed as limiting the invention thereto. It is now clear that other solvents or solvent mixtures may be found.

TABLE 2

STOICHIOMETRIC QUANTITIES OF PARA XYLYLENEDICHLORIDE AND 4,4'-ISOPROPYLIDENE DIPHENOL (BISPHENOL-A) ARE REACTED IN CASES 1 THROUGH 6. $K_2CO_3$ WAS USED AS THE BASE

| | Reaction solvent | Reaction temperature, °C. | Time, hr. | Polymer product properties | | |
|---|---|---|---|---|---|---|
| | | | | Moldable | Fibers | Glass reinforced |
| 1 | Dimethylacetamide | 90-200 | 1 | Yes | Yes | Yes. |
| 2 | Dibenzyl ether | 150-210 | 3 | Very poorly | No | Poor. |
| 3 | 1;1-dimethylacetamide dibenzyl ether | 90-200 | 3 | Yes | Yes | Yes. |
| 4 | 3:2 dimethylformamide;1-chloronaphthalene | 190 | 2 | Yes | Yes | Yes. |
| 5 | Anisole | Reflux | 4 | Poorly | No | Poor. |
| 6 | Methyl isopropyl ketone | Reflux | 4 | Yes (weak) | Yes (weak) | Yes (weak). |
| 7 | Anisole | Reflux | 4 | See footnote a to table | | |
| 8 | Dimethylformamide | Reflux | 4 | See footnote b to table | | |
| 9 | None | 250 | ¼ | See footnote c to table | | | a Stoichiometric paraxylylenedichloride and phenolphthalein. The resultant polymer product was separated into a fusible, methylene chloride soluble portion, and an infusible, methylene chloride insoluble portion. The resultant polymer was only partially soluble in the anisole.

b Dry sodium salt of bisphenol-A was reacted with a stoichiometric quantity of paraxylylenedichloride without an additional base added. The resultant polymer was only partially soluble in the dimethylformamide. The resultant polymer melted at about 198° C. When 1-chloronaphthalene mixed with dimethylformamide was used as a reaction medium the resultant polymer was soluble and it melted at about 210° C. The same reaction was carried out in dimethylformamide using a 10% excess of DPC, and after 1 hr. of reaction adding sufficient adipoyl chloride to bring ingredient content back to stoichiometry. The new polymer was still only partially soluble but greatly swollen. The purified polymer melted at about 207-209° C.

c Stoichiometric quantities of bisphenol-A and 4,4'-bis(chloromethyl) diphenyl ether mixed with 5% excess CaO was heated by means of an oil bath. The reaction proceeded rapidly with foaming and discoloration forming a brittle, insoluble non-moldable solid foam.

Substantially any DPC can be employed in accordance with the present invention. Thus, one can employ any DPC, low molecular weight or polymeric, which is free of additional substituents which will react under the conditions of the reaction. Such compounds include:

bis(4-hydroxyphenyl) methane,
bis(4-hydroxy-3-methylphenyl) methane,
bis(4-hydroxy-3,5-dimethylphenyl) methane,
1,1-bis(4-hydroxyphenyl) ethane,
2,2-bis(4-hydroxyphenyl) propane,
2,2-bis(4-hydroxy-3,5-dichlorophenyl) propane,
2,2-bis(4-hydroxyphenyl) butane,
1,1-bis(4-hydroxyphenyl) cyclohexane,
1,1-bis(4-hydroxyphenyl)-1-phenylethane,
bis(4-hydroxyphenyl) sulfone,
phenolphthalein,
hydroquinone,
tetrachlorohydroquinone,
orcinol,
4,4'-dihydroxydiphenyl,
bis(4-dihydroxyphenylether),
thymolphthalein,
bis(4-hydroxyphenyl) ketone,
resorcinol,
dihydroxynaphthalene,
chlorohydroquinone,
methylhydroquinone,
bis(4-hydroxy phenyl) sulfide,
bis(4-hydroxy phenyl) sulfoxide, and the like as well as mixtures thereof.

It is aso clear from the art that dithiophenols may be utilized in the same type reaction as well as mixtures of thiophenol and phenol so long as there are two of the reactive functions, of either type or mixed, per molecule.

It is also clear from the examples of this disclosure that other acidic hydroxyls known to the art may be substituted for phenolic hydroxyl.

It is also clear from the art that new and improved high polymers such as those disclosed herein may be compounded with reinforcing materials, antioxidants, flame proofing agents, antifungicides, coloring agents, mold release agents, and various other additives not described herein.

It is also clear from the art that fibers and films fabricated from new and improved high polymers such as those disclosed herein may be combined with other fibers and films, synthetic and natural, with beneficial results.

Substantially any RCDCMD, as described in this disclosure, can be employed in accordance with the present invention. Thus, one can employe any RCDCMD, low molecular weight or polymer, which is free of additional functions or substituents which will react under the conditions of the reaction. Such compounds include, for example, the bis(chloromethyl) benzenes including the nuclear halo-, alkyl-, alkoxy-, and aryl substituted compounds; the bis(chloromethylphenyl) compounds as bis(chloromethyl) biphenyl, bis(chloromethylphenyl) oxide, bis(chloromethylphenyl alkanes, including the nuclear halo-, alkyl-, alkoxy-, and aryl substituted compounds; bis(chloromethyl) ethers, bis(chloromethyl) ketones, as well as mixtures of the above.

The following examples are given to illustrate the products that may be prepared in accordance with the present invention as well as to display utility of said reaction products, but are not to be construed as limiting the invention thereto.

EXAMPLE 1

Reaction of para-xylylenedichloride with bis(4-hydroxyphenyl) sulfone (A) An 0.1-liter flask was equipped with a stirrer, heating mantle and reflux condenser. The flask was charged with 0.01 mole (1.75 gr.) of paraxylylenedichloride, 5% excess of $K_2CO_3$, and 25 ml. dimethylacetamide. While agitating, the temperature was slowly raised. Reflux temperature had not yet been reached but the solution was already very viscous after ½ hour. After an additional hour of heating and mixing, the solution was permitted to cool to room temperature. The resultant polymer was insoluble in the reaction medium at room temperature. The reaction products were poured, with mixing, into water containing sufficient HCl to neutralize. The resultant white polymer was washed and then dried. The resultant polymer which was recovered in 100% yield melted at about 220° C. Strong fibers were drawn from the melt. The fibers were found to be highly oriented by polarized light. A clear, colorless disc was pressed from the white powder at about 235° C. and 300 p.s.i. Strong films were also pressed from the polymer. A mixture of 70% of the resultant powder and 30% of chopped glass fiber was pressed to a very strong glass reinforced disc. The polymer may be formed in solid articles of desired size and shape.

(B) Following a procedure similar to the foregoing prior to the point of cooling to room temperature, the solvent was recovered by vacuum stripping. The remaining solids were mixed in a Waring blender with water containing sufficient acid for neutralization. The resultant polymer was filtered, then washed, then dried. Its properties were similar to that of polymer obtained in Example 1A.

(C) Following a procedure similar to that of Example 1A, a small amount of KI was included in the reaction recipe. The polymeric product was substantially the same as in Example 1A.

(D) A procedure similar to that of Example 1A was followed except that the reaction system was purged of oxygen and was carried out in the presence of inert gas. The polymeric product, except for being of lighter color, had substantially the properties of the product from Example 1A.

EXAMPLE 2

Variation of solvent resistance of typical products

Following a procedure similar to that of Example 1 other high molecular weight polyalkylarylethers were prepared. Solvent resistance to common organic solvents varies broadly with the product high polymer structures. The qualitative solvent resistance of representative reaction products from reaction of RCDCMD with DPC are as follows:

| RCDCMD | DPC | | Solvents [a] | | | | | | | | | | |
|---|---|---|---|---|---|---|---|---|---|---|---|---|---|
| | | | — | 1 | 2 | 3 | 4 | 5 | 6 | 7 | 8 | 9 | 10 |
| Paraxylylenedichloride | Phenolphthalein | C | + | — | + | S | S | — | S | | | | — |
| | | H | + | — | + | S | S | — | S | | | | — |
| Do | Bisphenol-A | C | — | — | — | — | — | — | — | — | | | — |
| | | H | — | — | — | + | — | — | — | + | + | | — |
| Do | Bis(4-hydroxyphenyl)sulfone | C | — | — | — | — | — | — | — | — | | | — |
| | | H | — | — | — | + | — | — | — | — | + | | — |
| 4,4'-bis(chloromethyl)DPE [b] | Phenolphthalein | C | S | — | | | + | S | — | + | + | | + |
| | | H | + | — | | | + | + | — | + | + | | + |
| Do | Bis(4-hydroxyphenyl)sulfone | C | + | — | + | S | — | — | + | + | | | + |
| | | H | + | — | + | S | — | — | + | + | | | + |
| Di(chloromethyl)toluene | Phenolphthalein | C | + | — | + | + | + | — | + | | | | |
| | | H | + | — | + | + | + | — | + | | | | |
| Do | Bis(4-hydroxyphenyl)sulfone | C | — | — | — | — | — | — | — | — | + | | — |
| | | H | — | — | — | — | — | — | — | — | + | | — |
| Bis(chloromethyl)ether | Bisphenol-A | C | S | — | | | — | — | — | + | | | + |
| | | H | S | S | | | S | S | | + | | | + |
| Do | Bis(4-hydroxyphenyl)sulfone | C | S | — | | | S | S | | + | | | S |
| | | H | S | S | | | + | S | | + | | | + |
| Do [c] | Bisphenol-A | C | S | — | | | S | S | | + | | | + |
| | | H | S | S | | | + | S | | + | | | + |
| Do [c] | Bis(4-hydroxphenyl)sulfone | C | S | — | | | S | S | | + | | | S |
| | | H | S | S | | | S | S | | + | | | + |

[a] Solvents: 1-methylene chloride, 2-toluene, 3-tetrachloroethylene, 4-benzylether, 5-dioxane, 6-ethyl acetate, 7-tetrahydrofuran, 8-pyridine, 9-dimethylformamide, 10-ethanol; +=soluble, —=insoluble, S=swells or partially soluble, C=cold, H=hot.
[b] DPE=diphenylether.
[c] Slight excess of DPC was used. After 1 hr. of reaction a few ml. of pyridine was added and the system treated with phosgene.

EXAMPLE 3

Reaction of bis(4-chloromethylphenyl)ether with phenolphthalein 1.2127 gr. (0.00381 mole) of phenolphthalein, 1.0174 gr. (0.00381 mole) of bis(4-chloromethylphenyl)ether, 25 ml. of dimethylacetamide, a slight excess of $K_2CO_3$, and a trace of KI was stirred and heated as in the foregoing examples. After two hours of heating and mixing the solution was very viscous. The solution was mixed with water and sufficient HCl to neutralize the reaction system in a Waring Blender. The polymer was filtered, washed and dried. The reaction resulted in a 100% yield of a slightly yellow polymer which could be drawn into strong oriented fibers. The polymer melted at about 211° C. The polymer gave red indicator activity in the presence of base. Hard solid articles of desired size and shape may be formed by molding with heat and pressure.

EXAMPLE 4

A procedure similar to that of Example 3 was followed. It was found that the stoichiometry could be adjusted on the basis of the red-purple color caused by the presence of excess phenolphthalein. The polymer product may be used as an acid-base indicator.

EXAMPLE 5

Following procedures similar to the foregoing Example 1, various other high polymer products of DPC and RCDCMD were prepared; the physical properties of representative polymeric products are tabulated below

| DPC | RCDCMD | Liquid medium | Approximate starting M.P., ° C. |
|---|---|---|---|
| A | H | P | 226 |
| A | J | 2.5:1, P:Q | 212 |
| A | K | P | 211 |
| B | J | P | a >230 |
| B | K | P | 218 |
| B | H | P | 219 |
| B | N | P | b 45; 35 |
| 4:1, F:B | K | 3:1, P:R | >230 |
| 4:1, 4:B c | K | 3:1, P:R | >230 |
| 7:13, F:B | K | P | >230 |
| C | N | P | d 78, 62 |
| C | H | 5:3, Q:R | 210 |
| C | J | P | 155 |
| C | K | P | 191 |
| 1:1, C:D | 1:1, H:K | Q | >230 |
| 1:5, C:D | K | P | >230 |
| E | K | P | 190 |
| D | K | 5:2, P:T | >230 |
| D | H | Q | 225 |
| F | K | P | >230 |
| F | H | Q | >230 |
| G | K | P | >230 |
| 4:1, B:D | K | P | >230 |
| C | 3:1,H:M | V | 92 |
| C | M | V | 30 |
| C | 9:1, H:L | V | 130 |
| C | 9:1, H:M | V | 140 |
| 1:4, F:B | K | P | >230 | a >230 means the approximate starting melting point was above 230° C.
b System contained slight excess B and after 1 hr. of reaction, cooling adding pyridine, extended with phosgene.
c B was left out of the system until reaction had proceeded for 1 hr. a which time it was added.
d System contained slight excess C and after 1 hr. reaction, cooling adding pyridine, extended with phosgene.

Where:

A=phenolphthalein
B=bis(4-hydroxyphenyl)sulfone
C=bisphenol-A
D=4,4'-dihydroxydiphenyl
E=orcinol
F=hydroquinone
G=tetrachlorohydroquinone
H=para xylylenedichloride
J=dichloromethyltoluene
K=bis(chloromethylphenyl)ether
K=4,4'-bis(chloromethyl)diphenylether
L=bis(2-chloroethoxy)ethane
M=1,2-bis(2-chloroethoxy)ether
N=bis(chloromethyl)ether
P=dimethylacetamide
Q=dimethylformamide
R=1-chloronaphthalene
T=diphenylether
V=methylisobutylketone It is now clear that mixtures of DPC, RCDCMD, and of liquid mediums are workable in the present invention.

EXAMPLE 6

Reaction of active hydrogen, other than those of DPC, with RCDCMD

Following a procedure similar to that of Example 1 high molecular weight polyesters were prepared. 2.039 grams (0.0076 mole) of 4,4'-bis(chloromethyl)diphenyl ether, 1.269 grams (0.0076 mole) terephthalic acid, excess $K_2CO_3$, and mixed solvent 20 ml. dimethylacetamide+10 ml. tetrahydronaphthalene were heated as before. The resultant polymer could be drawn into birefringent fibers.

Materials such as polycarbonates, e.g., from the reaction of bisphenol A with phosgene, and polyarylethers such as may be prepared by reaction of bisphenol A with 4,4'-dichlorodiphenylsulfone, a dichloro activated-chlorine diaryl compound, are subject to stress cracking, particularly in the presence of chlorinated solvents. I have found that the insertion of methylene groups attached to the phenyl in such polymers, in many cases reduces the tendency toward stress cracking. For example, a mixture of 4,4'-dichlorodiphenylsulfone and p-xylyene dichloride was reacted with an equal molar quantity of bisphenol A to deliver a polymer, which when pressed into a test specimen was found to have a reduced tendency toward stress cracking compared to the commercial completely arylether polymer which may be prepared by reacting equal molar quantities of 4,4'-dichlorodiphenylsulfone and bisphenol A.

What I claim is:

1. A high molecular weight, strong fiber forming polymer consisting essentially of a repeating unit having a formula selected from the group consisting of

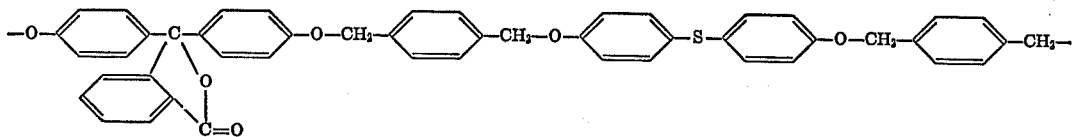

where the ratio of

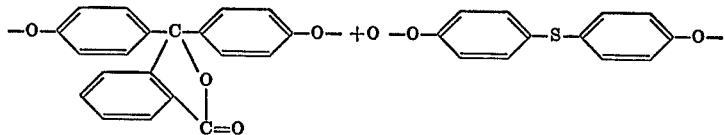

is between about 1:5 respectively and 7:13 respectively

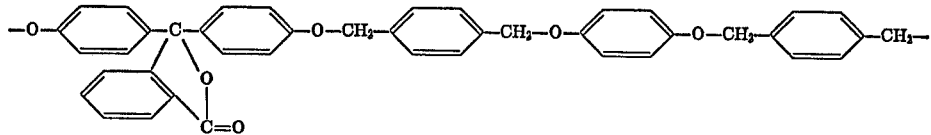

where the ratio of

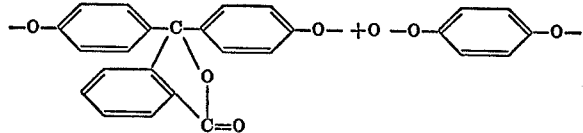

is between about 1:5 respectively and 7:13 respectively
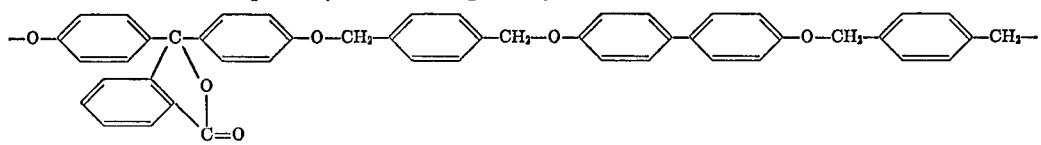
where the ratio of
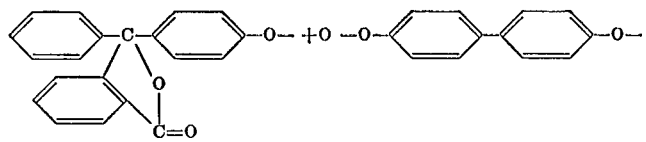
is between about 1:5 respectively and 7:13 respectively
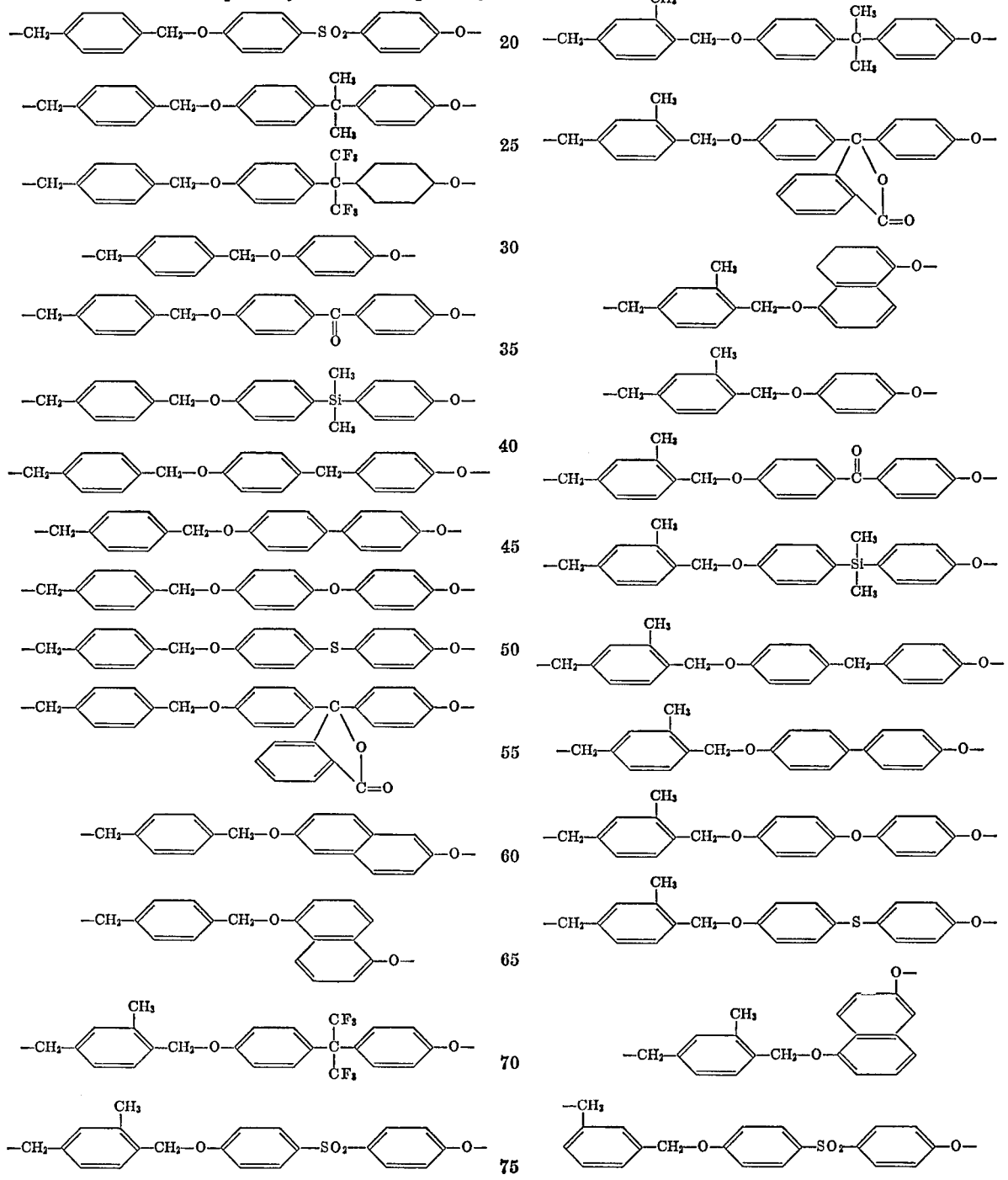

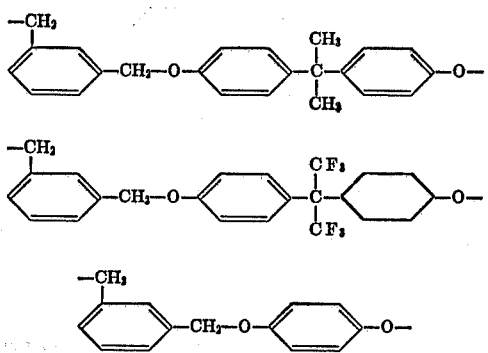
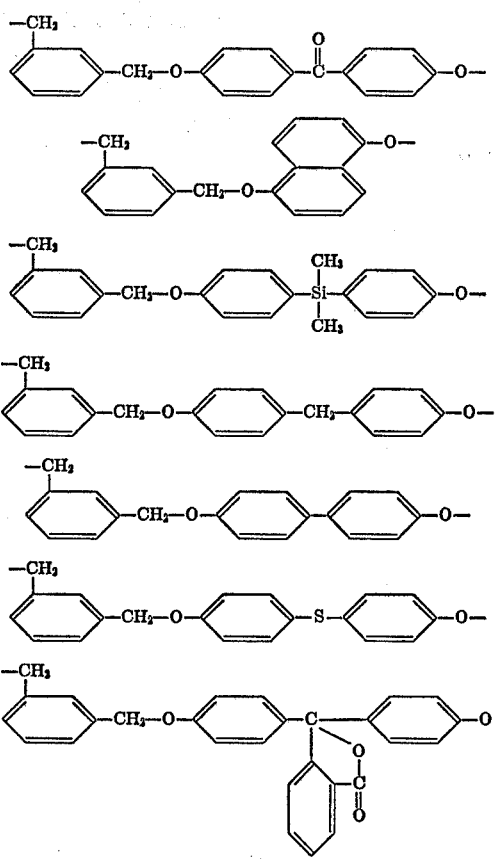

and mixtures thereof.

2. The high molecular weight strong fiber forming polymer according to claim 1 wherein the repeating unit consists of the formula

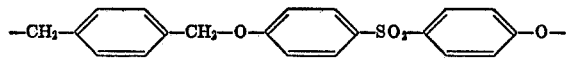

3. The high molecular weight strong fiber forming polymer according to claim 1, wherein the repeating unit consists of the formula

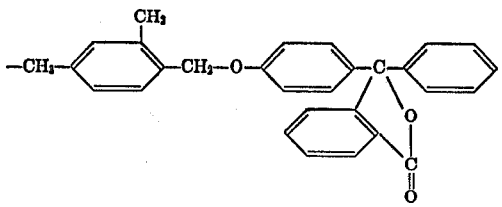

4. The high molecular weight strong fiber forming polymer according to claim 1, wherein the repeating unit consists of the formula

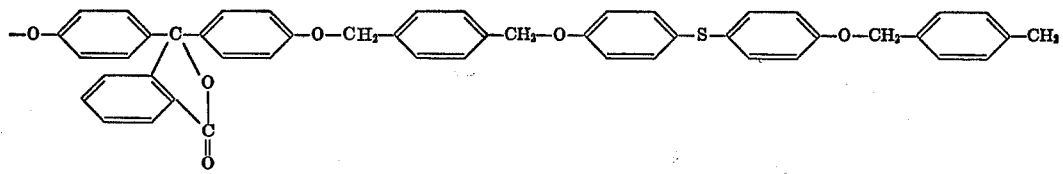

where the ratio of

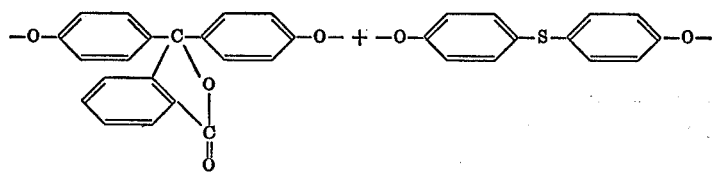

is between 1:5 respectively and 7:13 respectively.

5. High molecular weight strong fiber forming polymers consisting essentially of the reaction product of xylylenedihalides with diphenolic compounds.

6. High polymer strong fiber forming polyethers consisting essentially of the reaction product of a diphenolic compound which is free of additional substituents which will react under the conditions of the reaction with a mixture of a reactive chlorine difunctional chloromethyl derivative and a dichloroactivated-chlorine diaryl compound,

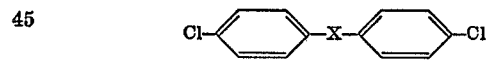

wherein X represents a group which activates the chlorines on the phenyl radicals.

7. High molecular weight strong fiber forming polymers consisting essentially of the reaction product of a diphenolic compound from the group consisting of:

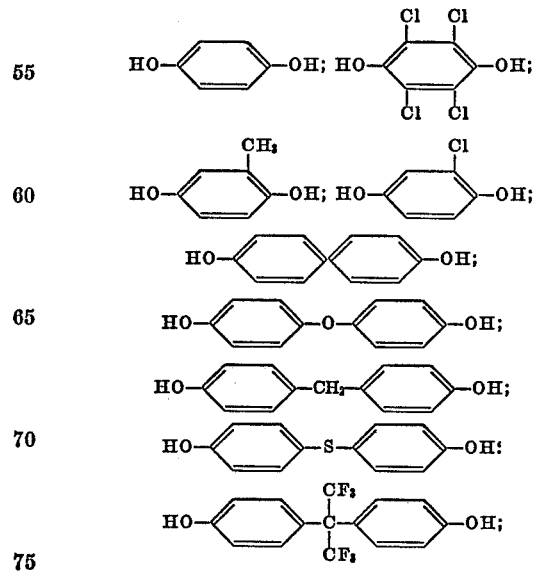

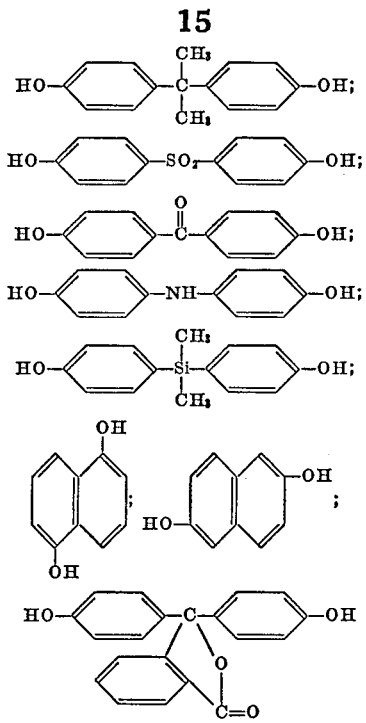

with a reactive chlorine difunctional chloromethyl derivative from the group consisting of:

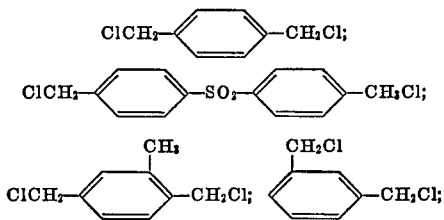

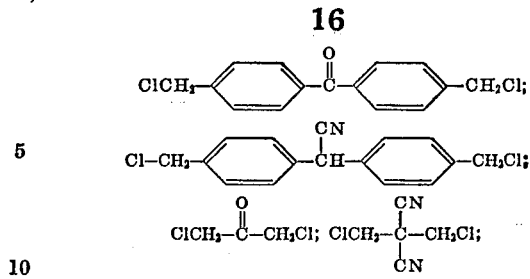

and mixtures thereof.

8. The high molecular weight strong fiber forming polymer according to claim 7 wherein the chlorodimethyl compound is paraxylylene dichloride and the diphenolic compound is a mixture of phenolphthalein and 4,4'-bis (chlorophenyl) sulfide.

References Cited
UNITED STATES PATENTS

| | | | |
|---|---|---|---|
| 2,060,715 | 11/1936 | Arvin | 260—2 |
| 3,075,949 | 1/1963 | Caldwell | 260—47 |
| 3,219,628 | 11/1965 | Doedens et al. | 260—61 |
| 3,532,677 | 10/1970 | Baron | 260—79.3 |

FOREIGN PATENTS

| | | |
|---|---|---|
| 1,078,234 | 8/1967 | Great Britain. |
| 1,177,183 | 1/1970 | Great Britain. |
| 854,315 | 10/1970 | Canada. |

OTHER REFERENCES

Tokarzewska: J. Polym. Sci. Part A–1, 6, 777–84 (1968).

Morgan: "Condensation Polymers," Interscience, New York, 1965, pp. 326–27, 334–41, 372–73.

Johnson et al.: J. Polym. Sci., Part A–1, 5, 2420–21 (1967).

MELVIN GOLDSTEIN, Primary Examiner

U.S. Cl. X.R.

260—47 R, C, 49